United States Patent
Abeywardena

(10) Patent No.: US 11,100,667 B2
(45) Date of Patent: Aug. 24, 2021

(54) SYSTEMS AND METHODS FOR GENERATING ANNOTATIONS OF STRUCTURED, STATIC OBJECTS IN AERIAL IMAGERY USING GEOMETRIC TRANSFER LEARNING AND PROBABILISTIC LOCALIZATION

(71) Applicant: Wing Aviation LLC, Mountain View, CA (US)

(72) Inventor: Dinuka Abeywardena, Mountain View, CA (US)

(73) Assignee: WING AVIATION LLC, Mountain View, CA (US)

( * ) Notice: Subject to any disclaimer, the term of this patent is extended or adjusted under 35 U.S.C. 154(b) by 36 days.

(21) Appl. No.: 16/669,309

(22) Filed: Oct. 30, 2019

(65) Prior Publication Data

US 2021/0133997 A1 May 6, 2021

(51) Int. Cl.
*G06T 7/70* (2017.01)

(52) U.S. Cl.
CPC ...... *G06T 7/70* (2017.01); *G06T 2207/10032* (2013.01); *G06T 2207/20081* (2013.01); *G06T 2207/30181* (2013.01); *G06T 2207/30244* (2013.01)

(58) Field of Classification Search
CPC ............. G06T 7/70; G06T 2207/10032; G06T 2207/20081; G06T 2207/30181; G06T 2207/30244
See application file for complete search history.

(56) References Cited

U.S. PATENT DOCUMENTS

| | | | |
|---|---|---|---|
| 8,942,483 B2 | 1/2015 | Janky et al. | |
| 9,324,003 B2 | 4/2016 | France et al. | |
| 2018/0253980 A1 | 9/2018 | Mohamadi | |
| 2019/0080142 A1* | 3/2019 | Abeywardena | B64D 47/08 |
| 2019/0130641 A1* | 5/2019 | Barajas Hernandez | G06T 17/20 |
| 2019/0197292 A1* | 6/2019 | Abeywardena | G06K 9/0063 |
| 2021/0027487 A1* | 1/2021 | Lawlor | G06T 7/80 |

OTHER PUBLICATIONS

Anonymous, "Open Street Map wiki: Map Features", Jul. 16, 2019, https://wiki.openstreetmap.org/wiki/map_features.

(Continued)

*Primary Examiner* — Bobbak Safaipour
(74) *Attorney, Agent, or Firm* — Christensen O'Connor Johnson Kindness PLLC

(57) ABSTRACT

In some embodiments, aerial images of a geographic area are captured by an autonomous vehicle. In some embodiments, the locations of structures within a subset of the aerial images are manually annotated, and geographical locations of the manual annotations are determined based on pose information of the camera. In some embodiments, a machine learning model is trained using the manually annotated aerial images. The machine learning model is used to automatically generate annotations of other images of the geographic area, and the geographical locations determined from the manual annotations are used to determine an accuracy probability of the automatic annotations. The automatic annotations determined to be accurate may be used to re-train the machine learning model to increase its precision and recall.

21 Claims, 13 Drawing Sheets

(56) References Cited

OTHER PUBLICATIONS

Konecny, "Chapter 3: Photogrammetry" In: "Geoinformation Remote Sensing Photogrammetry and Geographical Information Systems", Feb. 2, 2003.
Zhang "Chapter VI: Automatic and Semi-Automatic Techniques for Image Annotation" In: "Semantic-Based Visual Information Retrieval", Feb. 2, 2007.
Carrivick et al., "Chapter 4.8" In: "Structure from Motion in the Geosciences", Feb. 2, 2016.
Zhou et al. "Automatic Annotation of Airborne Images by Label Propagation based on a Bayesian-CRF Model", Remote Sensing vol. 11, No. 2, Jan. 1, 2019.
International Search Report and Written Opinion, dated Nov. 17, 2020, in corresponding International Patent Application No. PCT/US2020/049225, 15 pages.

* cited by examiner

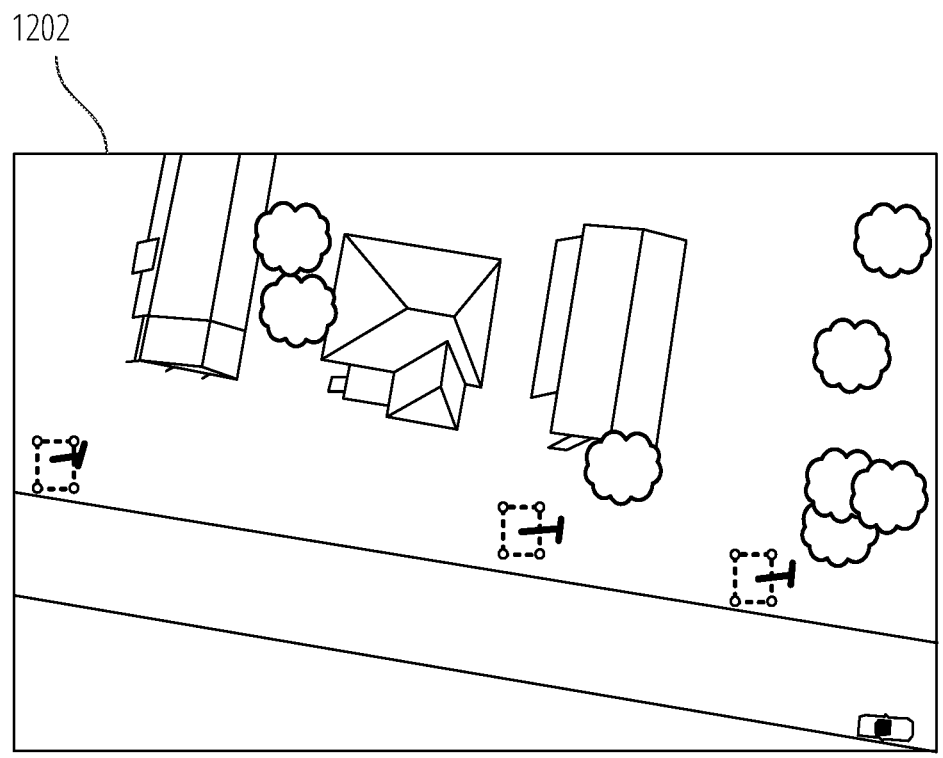
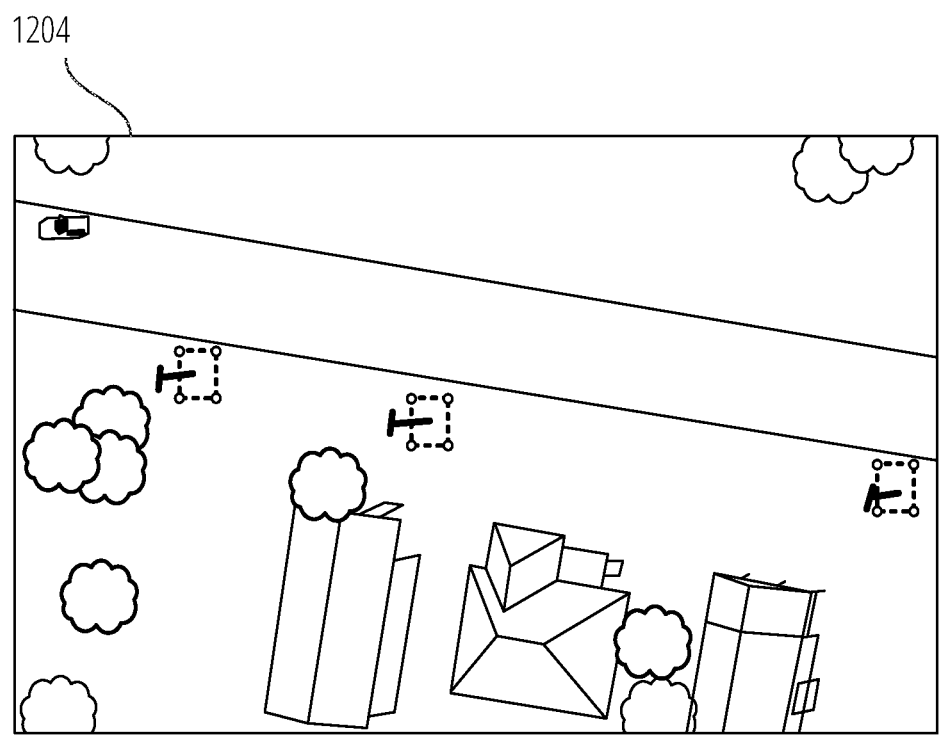
FIG. 12

SYSTEMS AND METHODS FOR GENERATING ANNOTATIONS OF STRUCTURED, STATIC OBJECTS IN AERIAL IMAGERY USING GEOMETRIC TRANSFER LEARNING AND PROBABILISTIC LOCALIZATION

TECHNICAL FIELD

This disclosure relates generally to computer vision, and in particular but not exclusively, relates to detecting objects in aerial imagery.

BACKGROUND

Structured objects are objects that have a specific structure, either geometric or semantic. Examples of structured objects in outdoor environments include, but are not limited to, power poles, power lines, swimming pools, and traffic lights. Detecting such objects in aerial images is an important step in various applications such as mapping, image analysis, image stitching, and route planning.

SUMMARY

In some embodiments, a non-transitory computer-readable storage medium is provided. The storage medium has instructions stored thereon that, in response to execution by one or more processors of a computing system, cause the computing system to perform actions comprising: determining geographical locations of one or more structures in a geographic area; obtaining an aerial image of the geographic area; and annotating the aerial image based at least on the determined geographical locations of the one or more structures in the geographic area.

In some embodiments, a computer-implemented method for annotating aerial images is provided. Annotations of one or more structures within aerial images of a set of aerial images of a geographic area are determined by a computing device. The computing device determines geographical locations associated with the annotations. The computing device updates a probabilistic localizer model based on the determined geographical locations. The computing device uses the probabilistic localizer model to determine annotations for new aerial images of the geographic area.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIG. 12 illustrates a non-limiting example embodiment of a set of aerial images of a single geographic area according to various aspects of the present disclosure.

DETAILED DESCRIPTION

State-of-the-art algorithms in detecting objects in images often involves Machine Learning (ML) models that are trained using supervised learning. Supervised learning typically uses a large collection of manually annotated examples to learn from. For object detection tasks, it is typical to employ tens of thousands of images that have been manually annotated (that is, labeled by humans). The task of performing such annotations is extremely labor-intensive, and therefore has considerable drawbacks:

1. Manual annotation is time consuming, often taking weeks to generate datasets that can be employed for supervised learning of object detection. This can result in ML models that are slow to adapt to changes in more recent data.
2. Manual annotation of tens of thousands of images can be expensive.
3. Large-scale manual annotation is error prone, resulting in both false positive and false negative annotations.
4. Some images, though they may be suitable for use as training data, may include sensitive information, and therefore may not be permissible to share with (or by) the annotators.

These drawbacks tend to result in either low quality or low quantity datasets, both of which negatively impact the performance of ML models employed for object detection.

In embodiments of the present disclosure, these problems (and more) are addressed to generate high-quality training data for improving the precision and recall of static object detection in aerial image datasets. The generation of high-quality training data allows for the training of high-quality ML models, thereby improving the ability to automatically detect structured objects in aerial imagery. In general, embodiments of the present disclosure derive geographical locations of annotations of structured objects in a first set of aerial images of a given geographic area used to train an ML model, and can then use these derived geographical locations to transfer the knowledge obtained from the first set of aerial images to subsequent sets of aerial images of the given geographic area.

Figure 1:
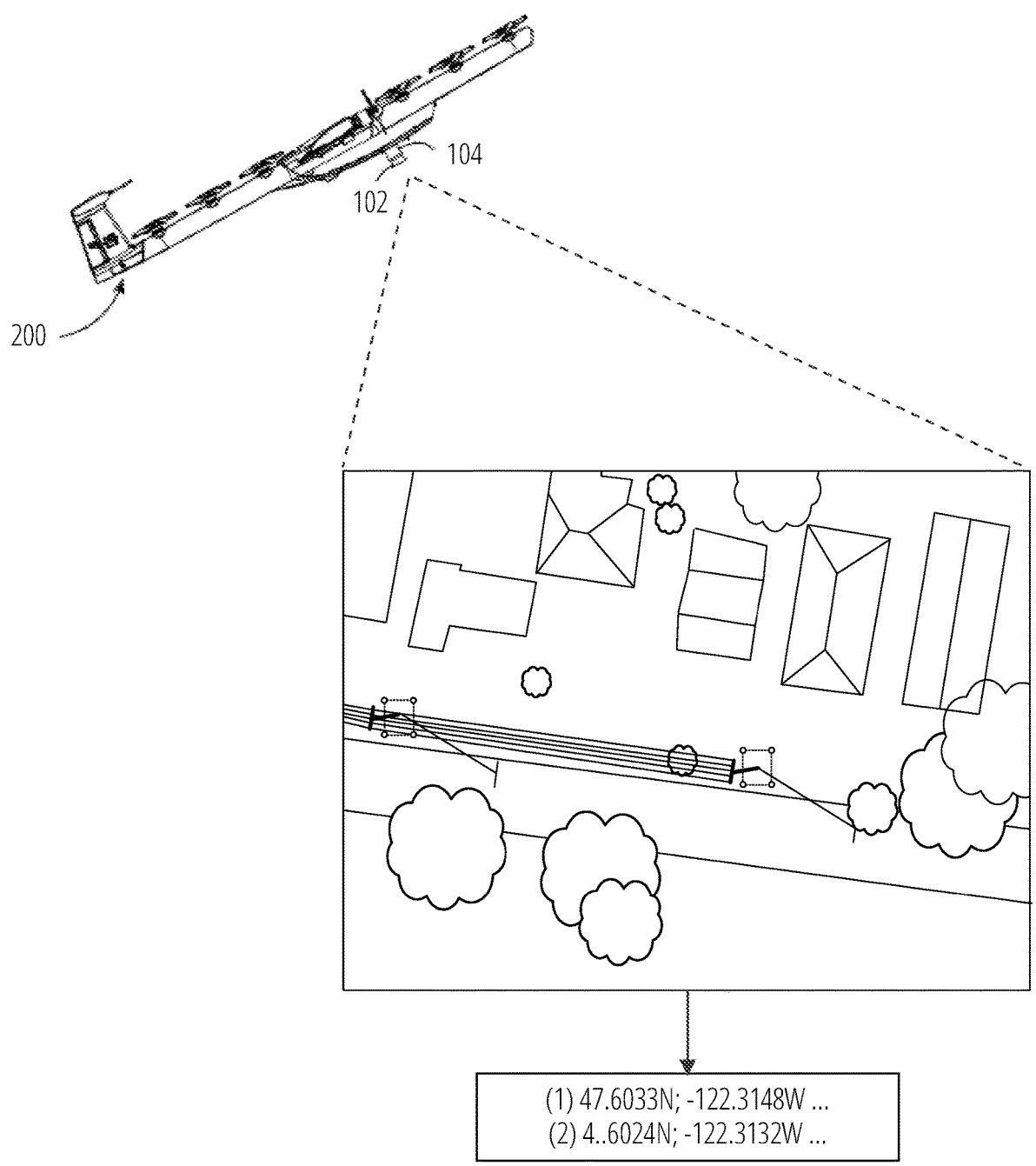
FIG. 1 is a schematic drawing that illustrates a non-limiting example embodiment of an autonomous vehicle capturing an aerial image according to various aspects of the present disclosure.

FIG. 1 is a schematic illustration of a non-limiting example embodiment of an autonomous vehicle capturing an aerial image according to various aspects of the present disclosure. As shown, an autonomous vehicle 200 is flying in a region with a view of a geographic area. A camera 102 of the autonomous vehicle 200 is pointed at the geographic area, and captures an aerial image of the geographic area. In some embodiments, the camera 102 may be mounted to the autonomous vehicle 200 using a pivot mechanism 104. In operation, the pivot mechanism 104 may adjust the angle of the camera 102 based on input from an inertial measurement unit (IMU) of the autonomous vehicle 200, for example, an accelerometer-based IMU that determines an absolute orientation of the autonomous vehicle 200 with respect to the direction of the gravity force. In response to the input from the IMU, the pivot mechanism 104 may orient the camera 102 vertically to the ground to provide a common reference angle for the aerial image. In other embodiments, the pivot mechanism 104 may orient the camera 102 at other angles.

A combination of the angle of the pivot mechanism 104, the absolute orientation of the autonomous vehicle 200, a position of the autonomous vehicle 200 obtained from a global navigation satellite system (GNSS) sensor, and/or other pose information for the camera 102 may be used to determine geographical locations of pixels in the aerial image. For example, in some embodiments, a set of aerial images that includes GNSS or other positioning information for the camera 102 for each aerial image may be used to generate a terrain model, and/or to obtain precise pose information for each aerial image using techniques including but not limited to visual structure from motion (SFM) techniques.

As discussed herein, these geographical locations can be used to transfer knowledge from a small set of manually annotated aerial images to a larger set of aerial images of the same geographic area. In some embodiments, the precise pose information for the aerial images and the terrain model can be used to find a rough geographical location for each annotation, and information from multiple annotations can be aggregated together in a probabilistic localizer in order to weed out false positives and increase confidence on true positives. This allows much larger training sets of aerial images to be automatically generated directly from the geographical locations associated with the high-confidence annotations, thus improving the quality of machine learning models trained using the data.

Figure 2:
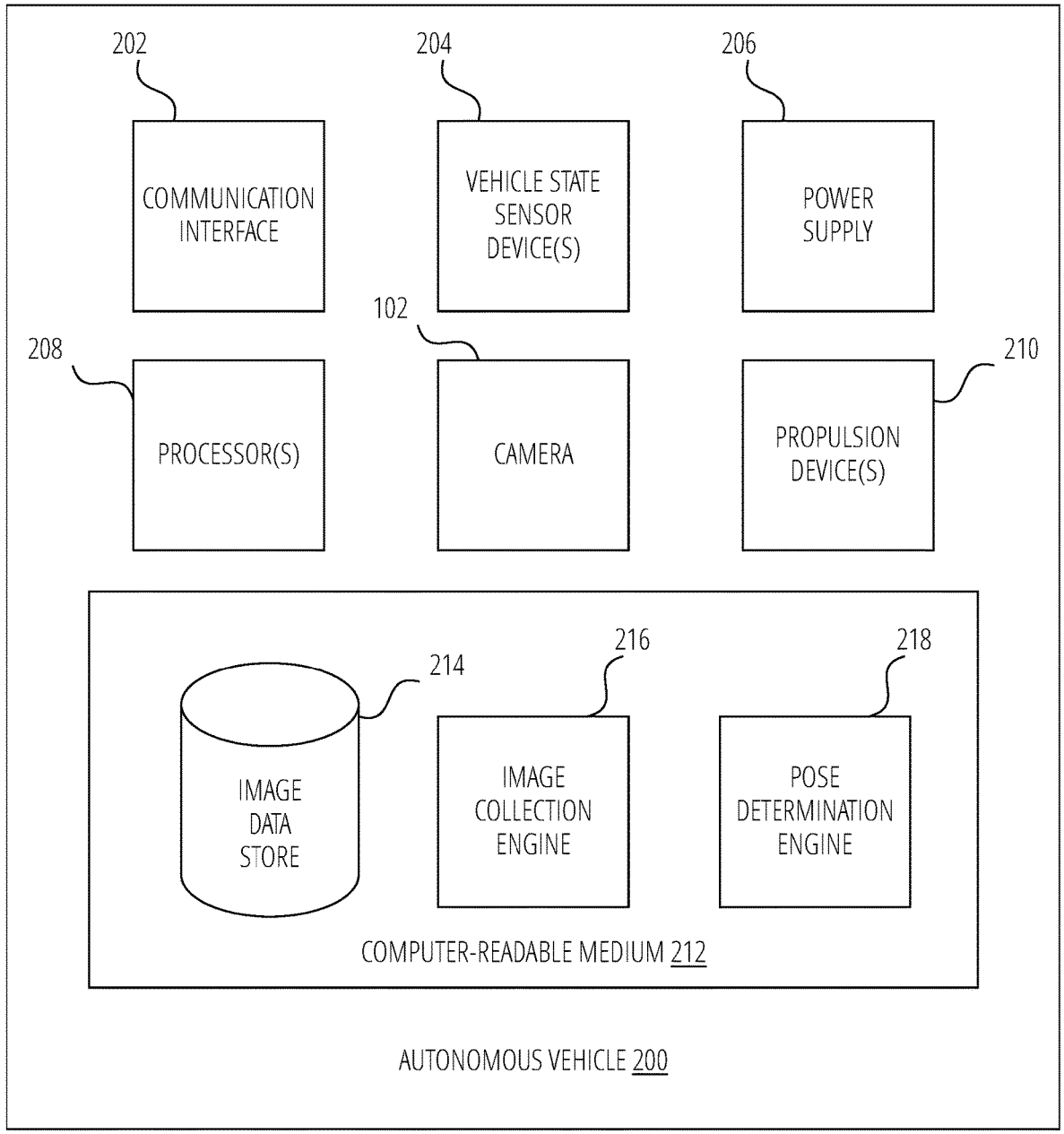
FIG. 2 is a block diagram that illustrates components of a non-limiting example embodiment of an autonomous vehicle 200 according to various aspects of the present disclosure.

FIG. 2 is a block diagram that illustrates components of a non-limiting example embodiment of an autonomous vehicle 200 according to various aspects of the present disclosure. The autonomous vehicle 200 is configured to collect aerial images, along with pose information for each collected aerial image. The autonomous vehicle 200 is also configured to transmit the collected aerial images and pose information to an image processing system 300, as discussed below. In some embodiments, the autonomous vehicle 200 is an aircraft, including but not limited to a rotary-wing aircraft. In other embodiments, any other type of autonomous vehicle 200 capable of collecting aerial images, including but not limited to a spacecraft and a balloon, may be used. In some embodiments, aerial images may be collected by a human-piloted vehicle instead of an autonomous vehicle 200.

As shown, the autonomous vehicle 200 includes a communication interface 202, one or more vehicle state sensor device(s) 204, a power supply 206, one or more processor(s) 208, one or more propulsion device(s) 210, and a computer-readable medium 212.

In some embodiments, the communication interface 202 includes hardware and software to enable any suitable communication technology for communicating with the image processing system 300. In some embodiments, the communication interface 202 includes multiple communication interfaces, each for use in appropriate circumstances. For example, the communication interface 202 may include a long-range wireless interface such as a 4G or LTE interface, or any other type of long-range wireless interface (e.g., 2G, 3G, 5G, or WiMAX), to be used to communicate with the image processing system 300 while traversing a route. The communication interface 202 may also include a medium-range wireless interface such as a Wi-Fi interface to be used when the autonomous vehicle 200 is at an area near a start location, an endpoint, or another location where Wi-Fi coverage is available. The communication interface 202 may also include a short-range wireless interface such as a Bluetooth interface to be used when the autonomous vehicle 200 is in a maintenance location or is otherwise stationary and waiting to be assigned a route. The communication interface 202 may also include a wired interface, such as an Ethernet interface or a USB interface, which may also be used when the autonomous vehicle 200 is in a maintenance location or is otherwise stationary and waiting to be assigned a route.

In some embodiments, the vehicle state sensor device(s) 204 are configured to detect states of various components of the autonomous vehicle 200, and to transmit signals representing those states to other components of the autonomous vehicle 200. Some non-limiting examples of vehicle state sensor device(s) 204 include a battery state sensor and a propulsion device health sensor. Some other non-limiting examples of vehicle state sensor device(s) 204 include sensors that allow a pose of the camera 102 to be determined, including but not limited to a sensor that reports the position of a pivot mechanism 104, an IMU sensor that reports an orientation of the autonomous vehicle 200 with respect to a gravity vector, and a GNSS sensor that reports a geographic position of the autonomous vehicle 200.

In some embodiments, the power supply 206 may be any suitable device or system for storing and/or generating power. Some non-limiting examples of a power supply 206 include one or more batteries, one or more solar panels, a fuel tank, and combinations thereof. In some embodiments, the propulsion device(s) 210 may include any suitable devices for causing the autonomous vehicle 200 to travel along the path. For an aircraft, the propulsion device(s) 210 may include devices such as, but not limited to, one or more motors, one or more propellers, and one or more flight control surfaces. For a spacecraft, the propulsion device(s) 210 may include devices such as, but not limited to, maneuvering thrusters. In some embodiments, the processor(s) 208 may include any type of computer processor capable of receiving signals from other components of the autonomous vehicle 200 and executing instructions stored on the computer-readable medium 212. In some embodiments, the computer-readable medium 212 may include one or more devices capable of storing information for access by the processor(s) 208. In some embodiments, the computer-readable medium 212 may include one or more of a hard drive, a flash drive, an EEPROM, and combinations thereof. In some embodiments, one or more of the processor(s) 208 and the computer-readable medium 212 may be included within an ASIC, FPGA, or other customized computing device.

As shown, the computer-readable medium 212 has stored thereon an image data store 214, an image collection engine 216, and a pose determination engine 218. In some embodiments, the image collection engine 216 is configured to cause the camera 102 to capture aerial images, and to store the aerial images in the image data store 214. In some embodiments, the pose determination engine 218 is configured to collect information from the vehicle state sensor device(s) 204 that can be used to determine the pose of the camera 102, and to store the information along with the aerial images in the image data store 214. This information for determining the pose of the camera 102 may include, but is not limited to, GNSS information, altimeter information, and set of aerial images usable for determining a pose via visual SFM techniques. In some embodiments, the pose determination engine 218 may be configured to determine the pose itself (e.g., the position of the camera 102 in space, and the orientation of the camera 102), and may store the pose in the image data store 214.

"Engine" refers to logic embodied in hardware or software instructions, which can be written in a programming language, such as C, C++, COBOL, JAVA™, PHP, Perl, HTML, CSS, JavaScript, VBScript, ASPX, Microsoft .NET™, Go, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computers, thus creating a special purpose computer configured to provide the engine or the functionality thereof.

"Data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 3:
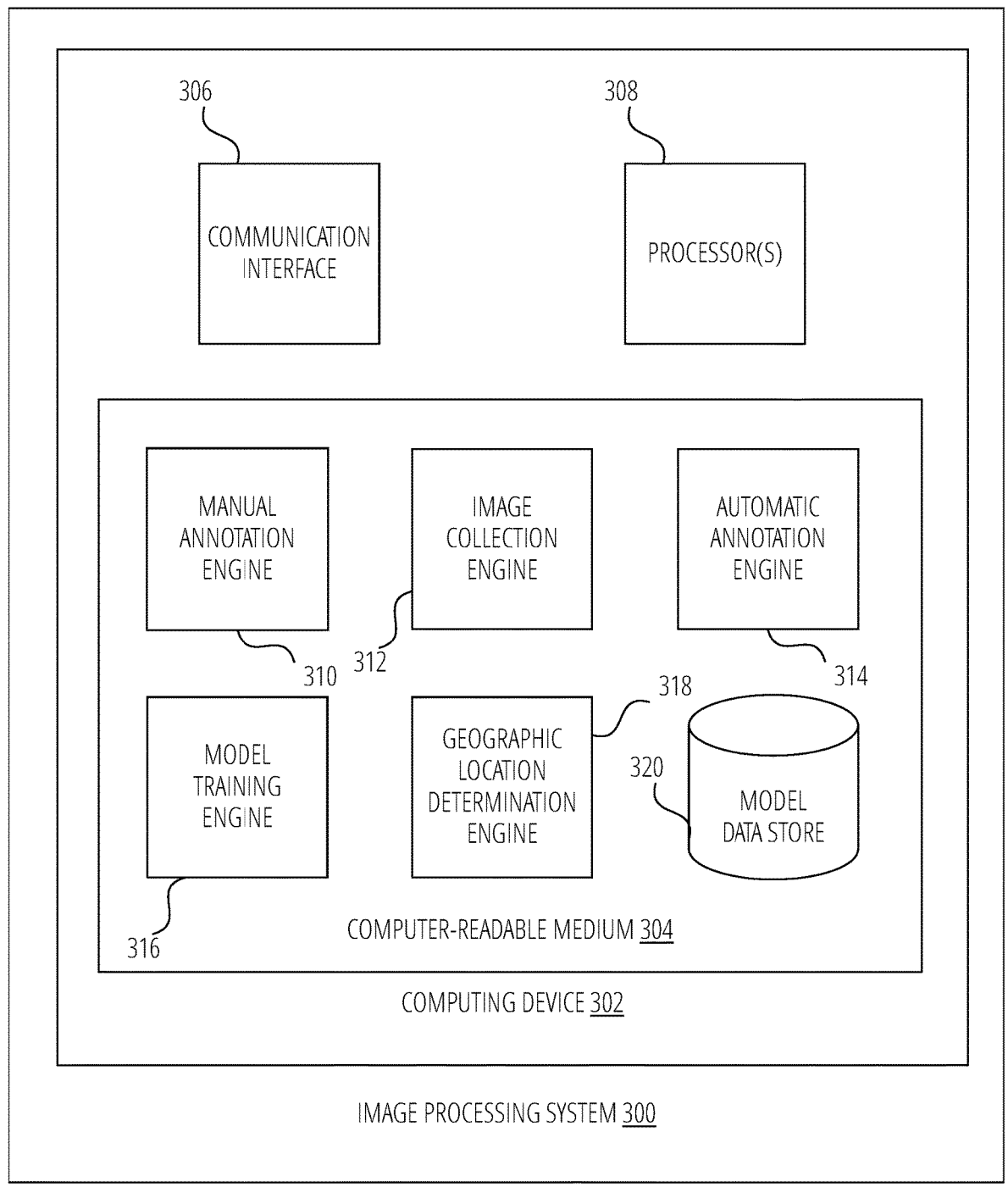
FIG. 3 is a block diagram that illustrates a non-limiting example embodiment of an image processing system 300 according to various aspects of the present disclosure.

FIG. 3 is a block diagram that illustrates a non-limiting example embodiment of an image processing system 300 according to various aspects of the present disclosure. In general, the image processing system 300 is configured to receive aerial images and to process them to detect structures. Starting from a relatively small set of manually annotated images, the image processing system 300 can build a large training data set by determining a probabilistic representation of the geographical locations of the structures being annotated, and then using the high-probability geographical locations to annotate additional aerial images. A machine learning model trained using such techniques can then provide highly accurate model-generated annotations of other geographic areas.

The image processing system 300 is illustrated as including a single computing device 302. In some embodiments, the functionality of the image processing system 300 may be provided by a single computing device 302. In other embodiments, the functionality of the image processing system 300 may be provided by more than one computing device 302 connected by a network and working in concert to provide the illustrated components. In some embodiments, the computing device 302 may be a server computing device, including but not limited to a rack mount computing device or a computing device of a cloud computing service. In some embodiments, the computing device 302 may be of another form factor, including but not limited to a desktop computing device, a laptop computing device, or a mobile computing device. In some embodiments, at least some of the processing described as being performed by the image processing system 300 may instead be performed by the autonomous vehicle 200.

As shown, the computing device 302 includes a communication interface 306, one or more processor(s) 308, and a computer-readable medium 304. In some embodiments, the communication interface 306 "Communication interface" refers to may implement any suitable communication technology, including but not limited to wired communication technologies (including but not limited to Ethernet, USB, and FireWire), wireless communication technologies (including but not limited to Wi-Fi, WiMAX, 2G, 3G, 4G, 5G, LTE, and Bluetooth), and combinations thereof. "Computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

As shown, the computer-readable medium 304 has stored thereon a manual annotation engine 310, an image collection engine 312, an automatic annotation engine 314, a model training engine 316, a geographic location determination engine 318, and a model data store 320.

In some embodiments, the manual annotation engine 310 is configured to collect manual annotations of aerial images from human operators, and to store the manual annotations along with the aerial images. In some embodiments, the image collection engine 312 is configured to receive aerial images from the autonomous vehicle 200 (or from more than one autonomous vehicle 200), and to provide the aerial images to other components for further processing. In some embodiments, the automatic annotation engine 314 is configured to use machine learning models stored in the model data store 320 to automatically annotate aerial images. In some embodiments, the model training engine 316 is configured to train machine learning models, and to re-train existing machine learning models, using training data stored in the model data store 320. In some embodiments, the geographic location determination engine 318 is configured to determine the geographic location of annotations associated with the aerial images. In some embodiments, the model data store 320 is configured to store aerial images, annotations, pose information, and machine learning models for use by the components of the image processing system 300.

Further description of actions performed by each of these elements is provided below.

Figure 4:
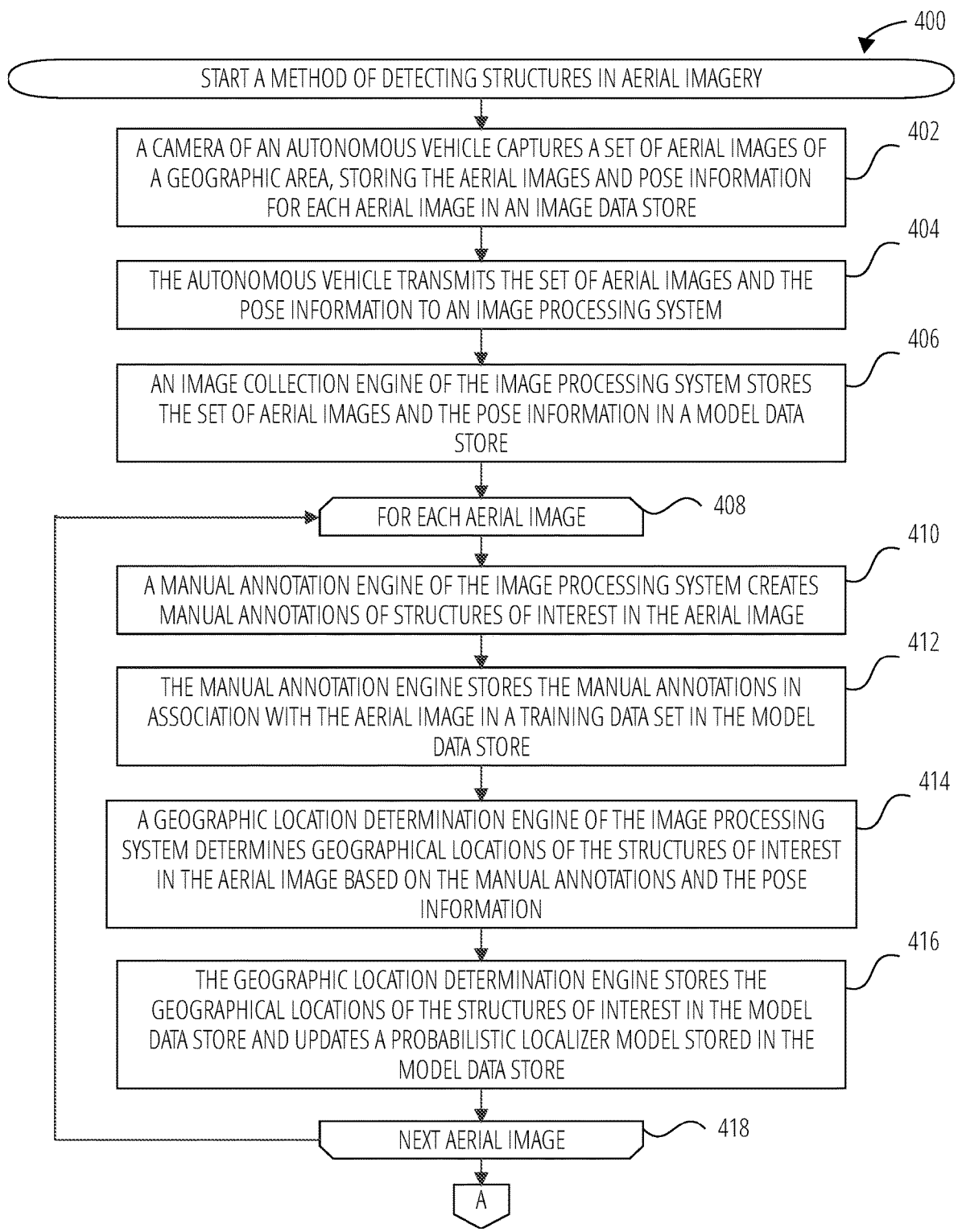
FIG. 4-FIG. 6 are a flowchart that illustrates a non-limiting example embodiment of a method of detecting structures in aerial imagery according to various aspects of the present disclosure.
Figure 5:
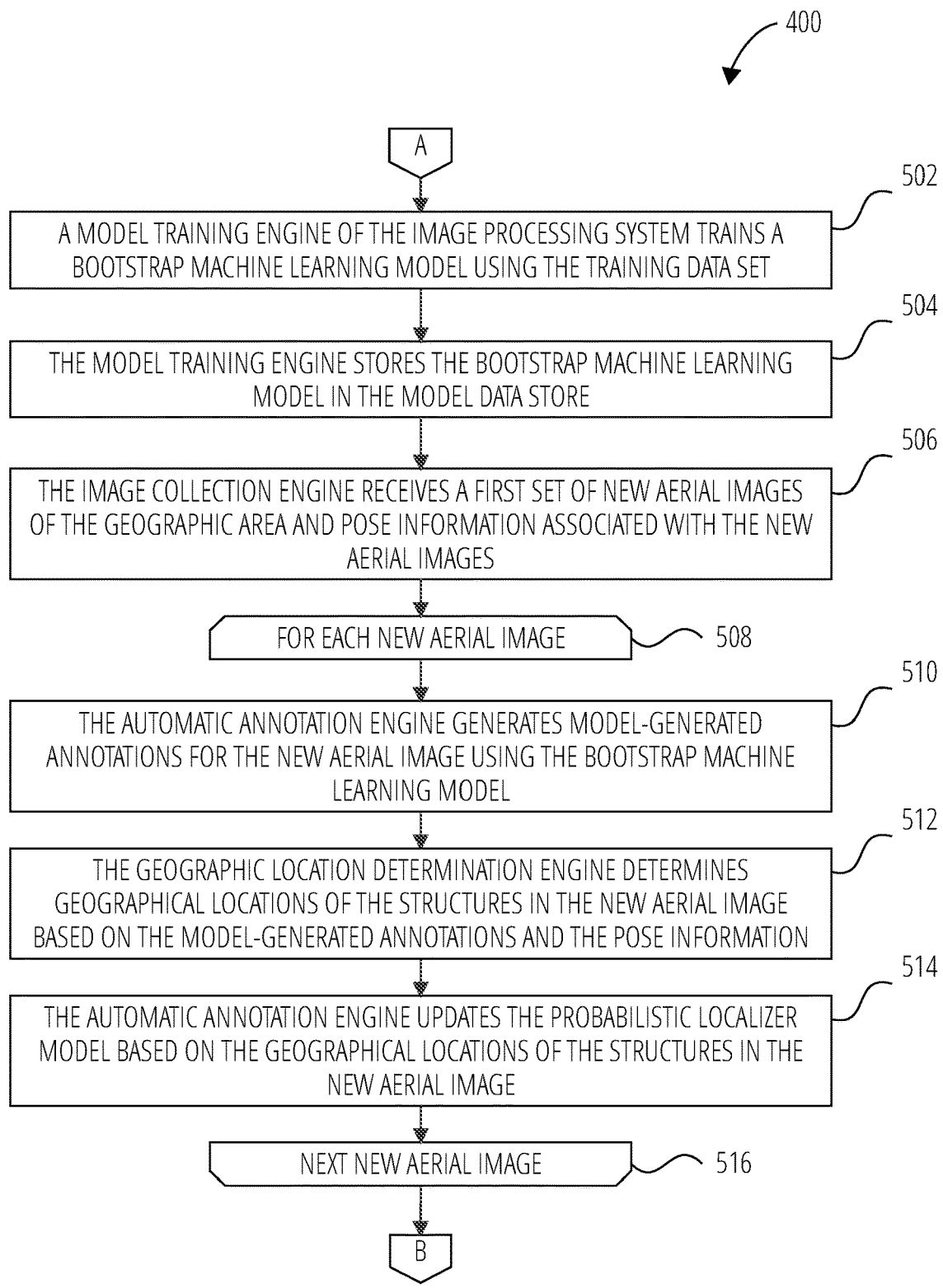
Figure 6:
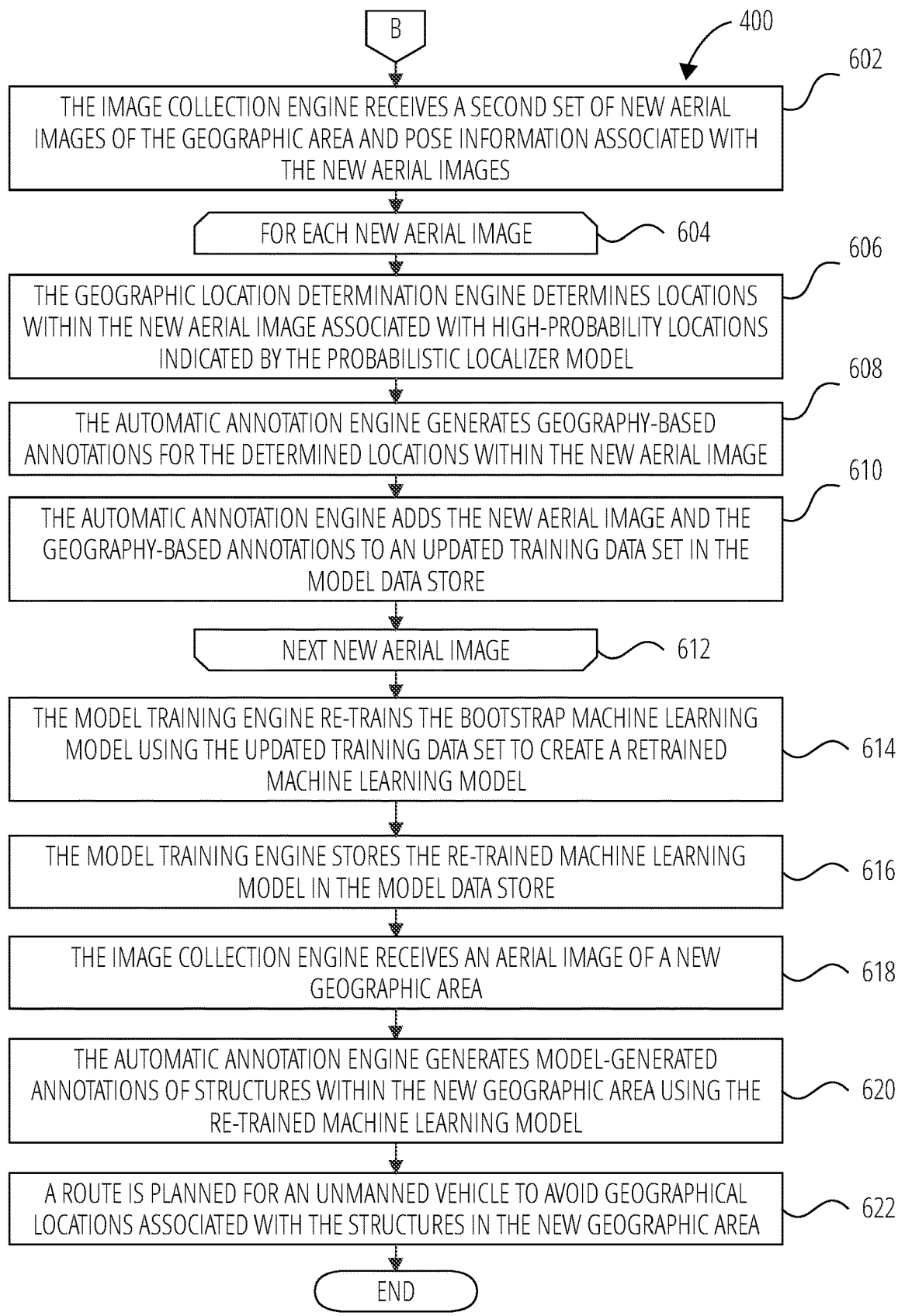

FIG. 4-FIG. 6 are a flowchart that illustrates a non-limiting example embodiment of a method 400 of detecting structures in aerial imagery according to various aspects of the present disclosure. The method 400 can be used to detect structures of interest, including but not limited to utility poles, light poles, or other static structures which a machine learning model is trained to detect as described below.

From a start block, the method 400 proceeds to block 402, where a camera 102 of an autonomous vehicle 200 captures a set of aerial images of a geographic area, storing the aerial images and pose information for each aerial image in an image data store 214. In some embodiments, the autonomous vehicle 200 traverses a route that passes within visual range of a geographic area to be imaged, and the image collection engine 216 causes the camera 102 to periodically capture aerial images. In some embodiments, the image collection engine 216 may collect aerial images that cover all of a desired geographic area while the autonomous vehicle 200 is in motion. In some embodiments, the image collection engine 216 may use the pivot mechanism 104 to aim the camera 102 at a desired geographic area.

In some embodiments, the image collection engine 216 may collect pose information from the vehicle state sensor device(s) 204 to accompany each aerial image, and may store the aerial images and the pose information in the image data store 214. In some embodiments, the pose determination engine 218 may be used to collect the pose information from the vehicle state sensor device(s) 204. In some embodiments, the pose information may be collected and stored as raw information (e.g., an angle of the pivot mechanism 104, an orientation of the autonomous vehicle 200, a position of the autonomous vehicle 200), while in some embodiments, the pose information may be collected and then transformed by the pose determination engine 218 to reflect the actual pose of the camera 102 (e.g., a position and orientation of the camera in three-dimensional space). In some embodiments, the pose information may include absolute position information such as GNSS information that includes, but is not limited to, a latitude, a longitude, and an altitude.

At block 404, the autonomous vehicle 200 transmits the set of aerial images and the pose information to an image processing system 300. In some embodiments, if the communication interface 202 includes a long-range wireless communication technology, the autonomous vehicle 200 may transmit the data to the image processing system 300 while traversing a route and capturing aerial images. In some embodiments, if the communication interface 202 only includes short-range wireless communication technology or wired communication technology, the transmission of the data may occur after the autonomous vehicle 200 returns to a base.

At block 406, an image collection engine 216 of the image processing system 300 stores the set of aerial images and the pose information in a model data store 320. In some embodiments, the set of aerial images and the pose information could be stored in a separate data store from the data store used to store machine learning models, such as a training data store. However, a single data store is illustrated and described herein for the sake of brevity.

The method 400 then proceeds to a for-loop defined between a for-loop start block 408 and a for-loop end block 418, wherein each aerial image of the set of aerial images is processed. In some embodiments, fewer than all of the aerial images of the set of aerial images collected by the image collection engine 216 may be processed in the for-loop. It is likely that the number of aerial images processed in the for-loop is small, due to the manual work in the for-loop. One of the benefits of the method 400 is that even processing a small number of aerial images allows the benefits of this processing to be automatically extended to larger sets of aerial images. The description of the for-loop assumes that each aerial image includes at least one structure to be annotated. If no structures to be annotated are present in a given aerial image, the aerial image may be skipped.

From the for-loop start block 408, the method 400 proceeds to block 410, where a manual annotation engine 310 of the image processing system 300 creates manual annotations of structures of interest in the aerial image. In some embodiments, the aerial image may depict multiple structures (such as buildings, trees, bridges, roads, etc.), but the manual annotations may be limited to types of structures of interest (such as utility poles, etc.). In some embodiments, the manual annotation engine 310 causes an annotation user interface to be presented to a user, either on a display device of the image processing system 300, on a display device of a client computing device over a network (such as by generating a web interface or providing an application programming interface (API) accessed by an application executing on the client computing device), or using any other suitable technique. The annotation user interface presents the aerial image to a user, and allows the user to add annotations for structures that the user sees in the aerial image. In some embodiments, each annotation may indicate corners of the associated structure. In some embodiments, and particularly for structures which are tall and thin and may therefore have an ambiguous location depending on the viewing angle, the annotation may indicate a base of the structure.

Figure 7:
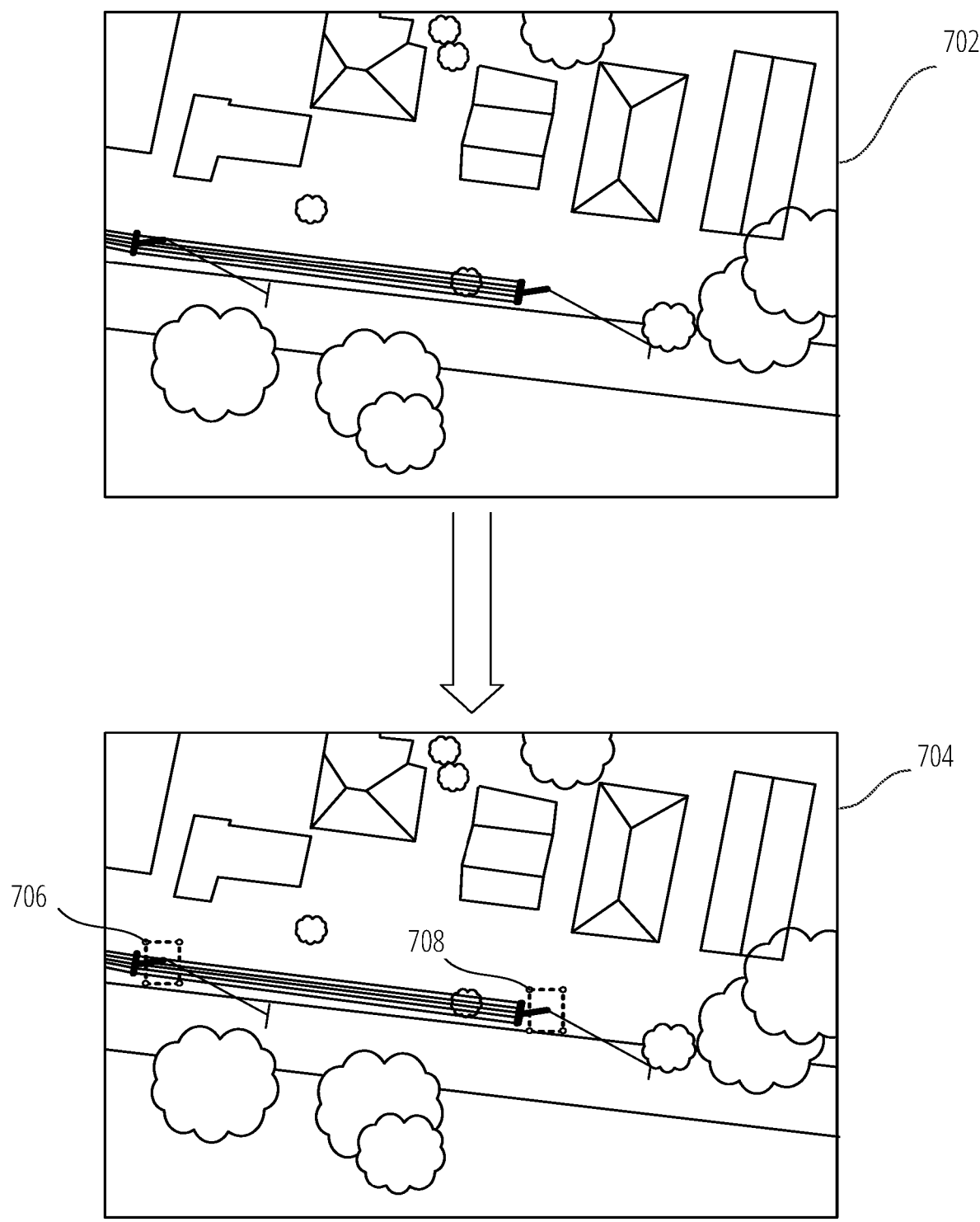
FIG. 7 illustrates a non-limiting example embodiment of an aerial image and an annotated aerial image according to various aspects of the present disclosure.

FIG. 7 illustrates a non-limiting example embodiment of an aerial image and a manually annotated aerial image according to various aspects of the present disclosure. The aerial image 702 illustrates several houses, a street, and two utility poles. The utility poles are objects of interest to be annotated within the aerial image. The tops of the utility poles can be seen, as can the power lines extending between the poles, and shadows cast by the poles. After being processed as discussed in block 410, two manual annotations are shown in the annotated aerial image 704: a first annotation 706 and a second annotation 708. The first annotation 706 and the second annotation 708 each surround a location of a base of a utility pole. The annotations may be added by a user by clicking corners of the annotation box, by dragging an annotation box to an appropriate location in the aerial image 702, or using any other suitable technique.

Returning to FIG. 4, at block 412, the manual annotation engine 310 stores the manual annotations in association with the aerial image in a training data set in the model data store 320. Again, the training data set may be stored in a separate data store from the model data store 320, but a single data store is illustrated and described herein for brevity. In some embodiments, the association between the manual annotations and the aerial image may be created by storing a record that includes references to the aerial image and each annotation.

At block 414, a geographic location determination engine 318 of the image processing system 300 determines geographical locations of the structures of interest in the aerial image based on the manual annotations and the pose information. In some embodiments, the geographical locations may include latitude and longitude values for the structures. In some embodiments, the geographical locations may also include altitude values.

As discussed above, the pose information includes information that either indicates a pose of the camera 102 or can be used to derive a pose of the camera 102. The pose information may include, but is not limited to, a position of the camera 102 in space (including but not limited to a latitude, a longitude, and an altitude), and an orientation of the camera 102 in space (including but not limited to a pitch of the camera 102 compared to a horizontal or vertical plane, a yaw of the camera 102 compared to a reference direction such as due north, and a roll of the camera 102 compared to a horizontal plane). The pose information may also include a zoom level of the camera 102. In some embodiments, the pose information may only include the position of the camera 102 in space.

In some embodiments, the pose information may be included within a plurality of aerial images of the geographic area such that, by taking a plurality of overlapping aerial images that include the geographic area along with the associated GNSS position data for the camera 102 associated with each overlapping aerial image, a technique such as visual structure from motion (Visual SFM) may be used to estimate a precise pose for each of the images. In some embodiments, such a precise pose would include a position estimate with sub-meter error and an orientation estimate with less than 1 degree of error.

In some embodiments, the precise pose derived from the Visual SFM technique may be used with the overlapping aerial images of the geographic area to generate a 3D model of the terrain of the geographic area. Any suitable technique may be used for generating the terrain model, including but not limited to a patch based multi-view stereo technique or a plane sweep stereo technique. In some embodiments, another source of terrain model information, such as a GIS system, may be used. Once the pose of the camera 102 and the terrain model are determined, ray tracing/ray casting or a similar technique may be used to determine geographic locations of annotations within the terrain model.

Figure 8:
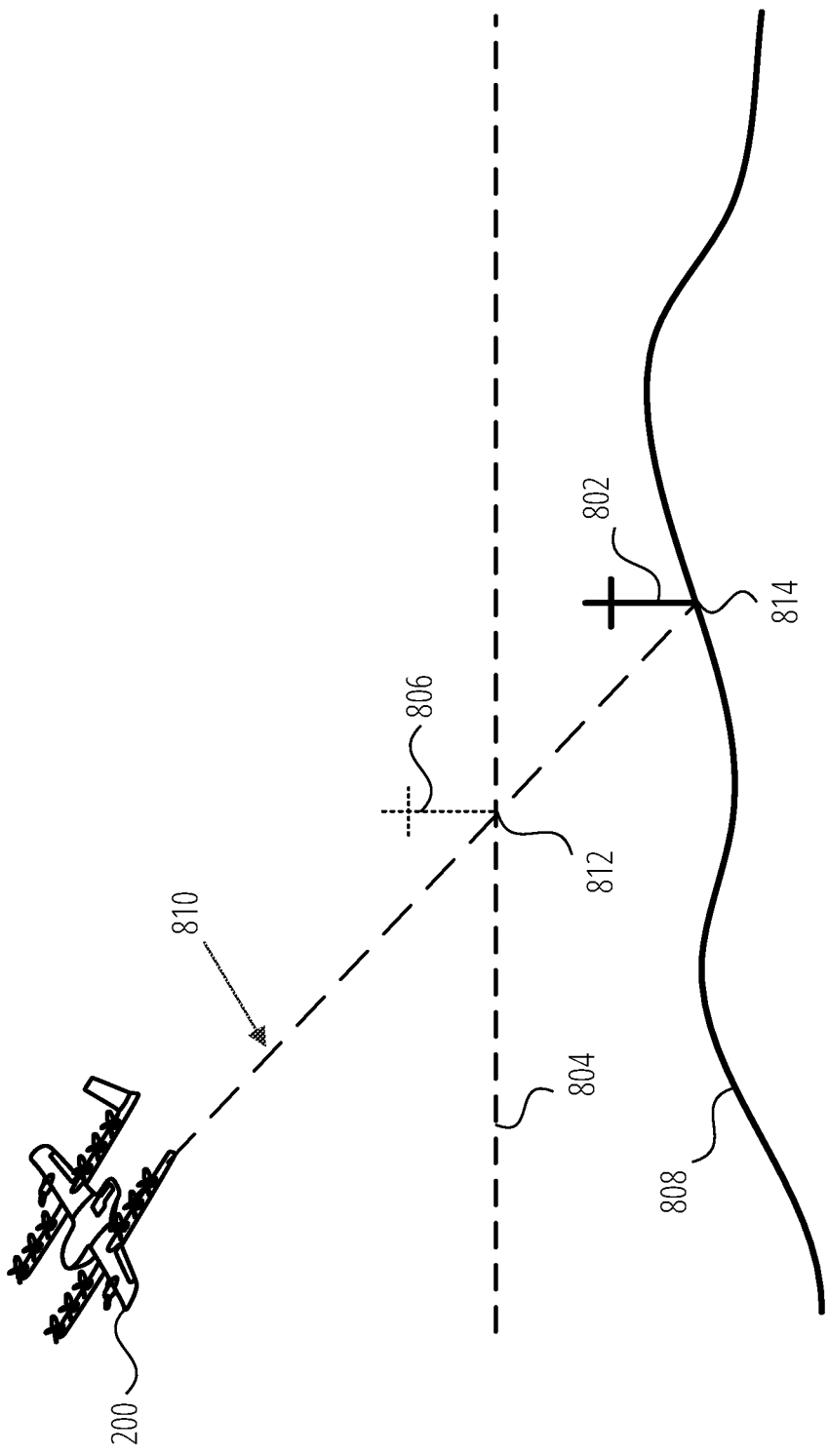
FIG. 8 is a side-view schematic illustration of a determination of a geographical location of a structure using pose information and a terrain model according to various aspects of the present disclosure.

FIG. 8 is a side-view schematic illustration of a determination of a geographical location of a structure using pose information and a terrain model according to various aspects of the present disclosure. As shown, a terrain model 808 that represents the contour of the geographic area has been determined. While the illustration in FIG. 8 is a two-dimensional cross-section, one will appreciate that in practice, the terrain model 808 is likely three-dimensional.

As shown, to determine a position of the structure 802 within the terrain model 808, a ray 810 is projected from the precise position of the camera 102 in the autonomous vehicle 200, along a vector that extends from the camera optical center through a center pixel of the annotated location of the structure 812 associated with the image of the structure 806. Then, a terrain model intersection point 814 is found based on where the ray 810 intersects the terrain model 808. The geographical location associated with the terrain model intersection point 814, which is a part of the terrain model 808, can then be used as the geographical location of the structure 802.

Returning to FIG. 4, at block 416, the geographic location determination engine 318 stores the geographical locations of the structures of interest in the model data store 320 and updates a probabilistic localizer model stored in the model data store 320. In some embodiments, the probabilistic localizer model is configured to represent an aggregate probability that a given geographical location includes a structure. In some embodiments, the probabilistic localizer model divides the geographic area into segments (such as squares or grids for a two-dimensional geographic area, or voxels for a three-dimensional geographic area).

Figure 9:
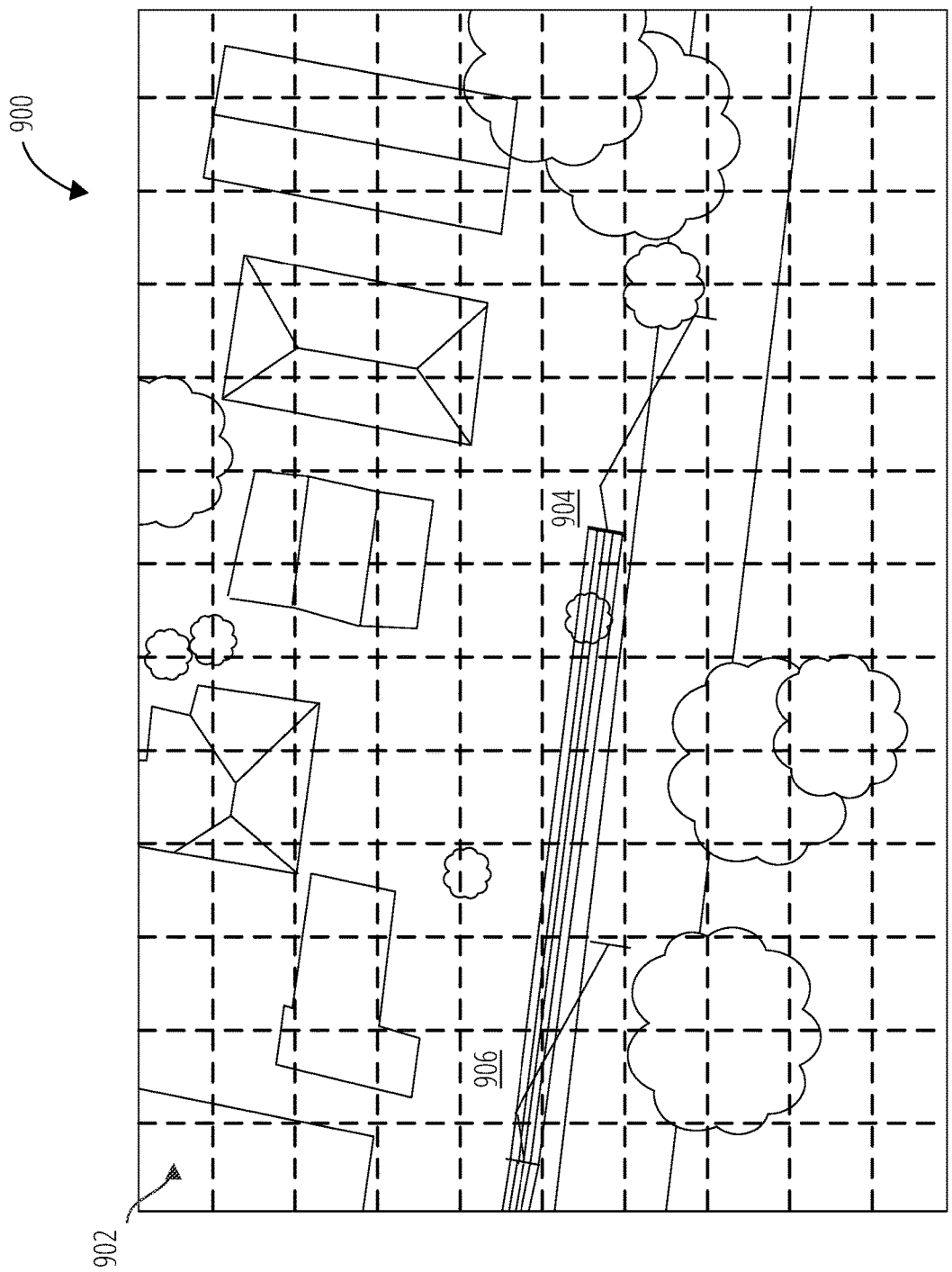
FIG. 9 is a schematic diagram that illustrates an aerial image 900 that has been overlaid with a probabilistic localizer grid 902 that divides the aerial image 900 into a plurality of segments according to various aspects of the present disclosure.
Figure 10:
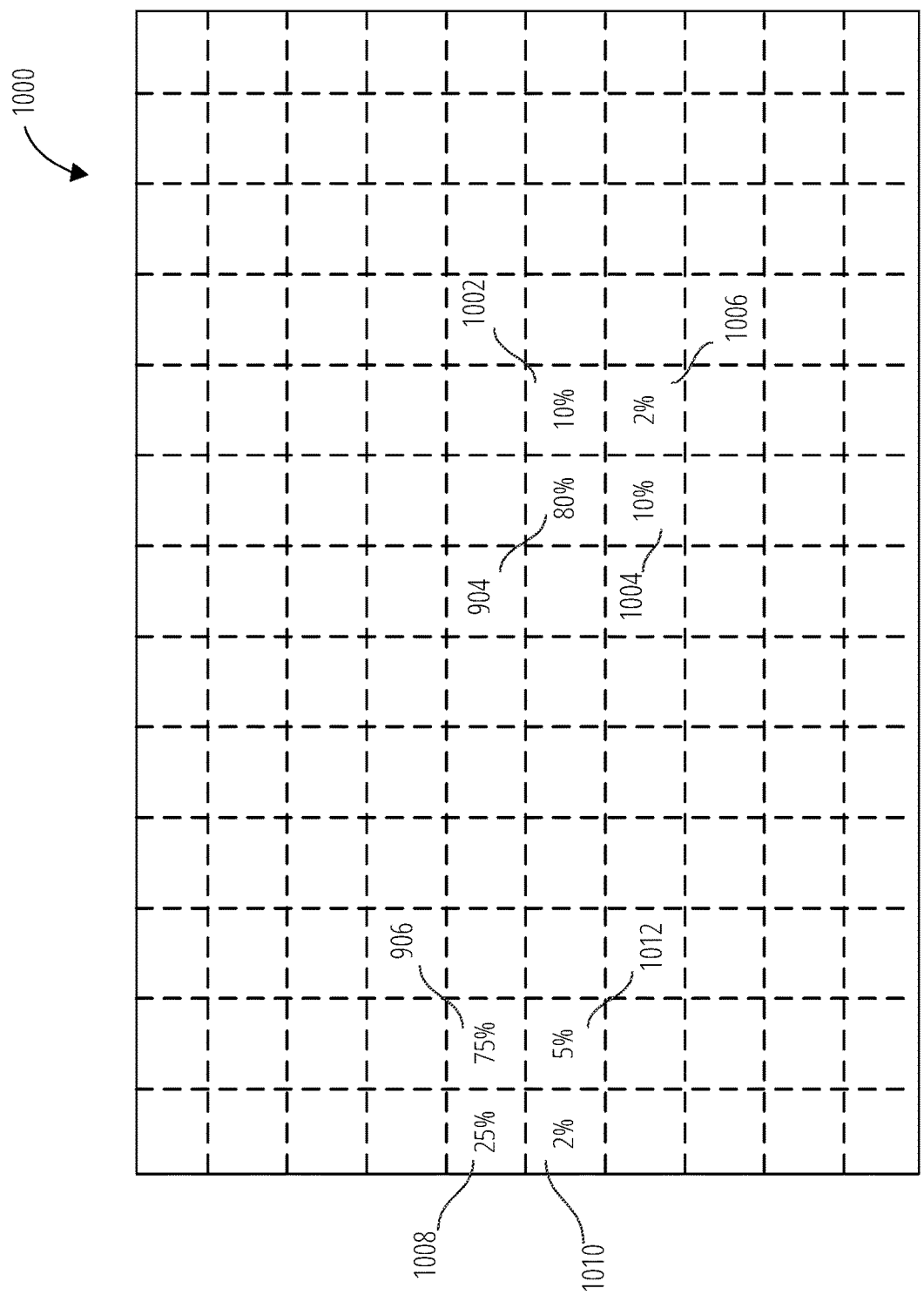
FIG. 10 is a schematic diagram that illustrates the probabilistic localizer model of FIG. 9 without the details of the aerial image, for the sake of clarity.

FIG. 9 illustrates an aerial image 900 that has been overlaid with a probabilistic localizer grid 902 that divides the aerial image 900 into a plurality of segments. The segments include a first grid square 904 that includes a first structure, and a second grid square 906 that includes a second structure. FIG. 10 is a schematic diagram that illustrates the probabilistic localizer model 1000 without the details of the aerial image, for the sake of clarity. The numbers within the grid squares of the probabilistic localizer model 1000 indicate a probability that a structure is actually present at the geographical location associated with the grid square, based on the annotations of the aerial images. Grid squares with a zero probability have been left blank for clarity.

As shown, the first grid square 904 and the second grid square 906 have a high probability of a structure being present, by virtue of the fact that the annotated locations of the first structure and the second structure would appear in those grid squares. Because the first structure and the second structure are close to the edges of the grid squares, some of the neighboring squares, such as the third grid square 1002, fourth grid square 1004, and fifth grid square 1006 neighboring the first grid square 904, and such as the sixth grid square 1008, seventh grid square 1010, and eighth grid square 1012 neighboring the second grid square 906, exhibit non-zero probabilities that structures are present. This could be due to inaccuracies in the determination of geographical locations for the annotations, inaccuracies in the pose estimations, or due to any other reason. However, it will be noted that, by updating the probabilistic localizer model 1000 with annotations from multiple other aerial images, the probabilities associated with the first grid square 904 and the second grid square 906 can increase more than the grid squares associated with the inaccurate data. Each new annotation can be used to update the probabilities included in the probabilistic localizer model 1000 using any suitable technique, including but not limited to Bayesian inferencing.

Figure 11:
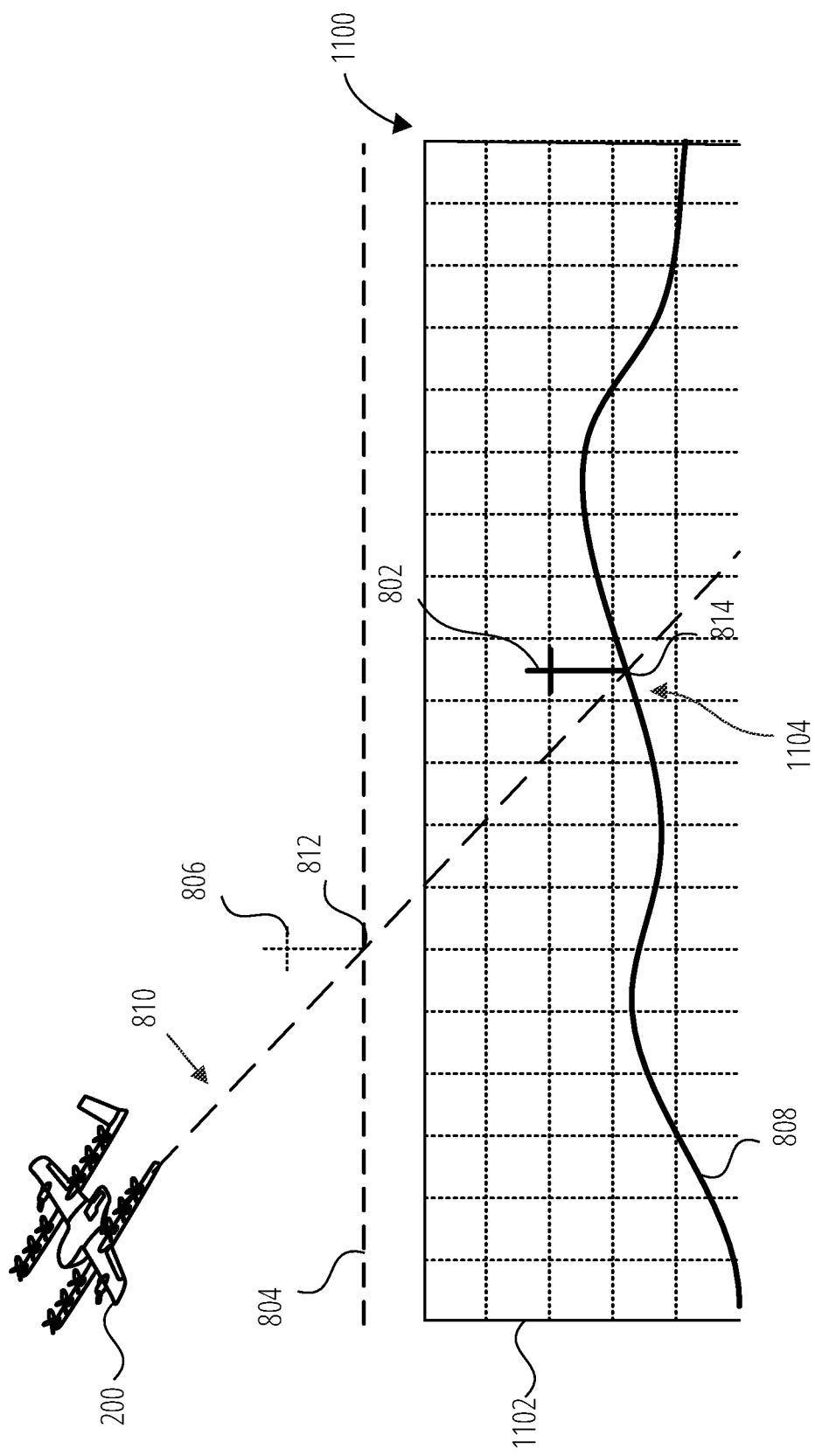
FIG. 11 is a side view of a non-limiting example embodiment of a three-dimensional probabilistic localizer model 1100 according to various aspects of the present disclosure.

The probabilistic localizer model 1000 illustrated in FIG. 10 is two-dimensional for the sake of clarity only. In some embodiments, a three-dimensional probabilistic localizer model may be used. FIG. 11 is a side view of a non-limiting example embodiment of a three-dimensional probabilistic localizer model 1100 according to various aspects of the present disclosure. As shown, a three-dimensional probabilistic localizer grid 1102 divides the geographic area into a set of voxels. Instead of finding a grid square as illustrated in FIG. 10, the voxel in which the ray 810 intersects the terrain model 808 is found. In the illustration, this is the first voxel 1104. Accordingly, Bayesian inferencing (or another suitable technique) can be used to update the probability associated with the first voxel 1104 of the probabilistic localizer model 1100 when the annotation associated with the image location 812 is processed.

Returning to FIG. 4, the method 400 then proceeds to the for-loop end block 418. If more aerial images remain to be processed, then the method 400 returns to the for-loop start block 408 to process the next aerial image. Otherwise, the method 400 proceeds to a continuation terminal ("terminal A").

From terminal A (FIG. 5), the method 400 proceeds to block 502, where a model training engine 316 of the image processing system 300 trains a bootstrap machine learning model using the training data set built within the for-loop 408-418. The machine learning model is referred to as a "bootstrap" machine learning model because it is not expected to have particularly high performance, but instead is meant to "bootstrap" the rest of the process by making it possible to start creating model-generated annotations that can be refined using geographic information. Any suitable type of machine learning model for detecting objects in an image may be used, including but not limited to a convolutional neural network. Further, any suitable technique for training the bootstrap machine learning model using the training data set may be used, including but not limited to gradient descent. At block 504, the model training engine 316 stores the bootstrap machine learning model in the model data store 320.

At block 506, the image collection engine 312 receives a first set of new aerial images of the geographic area and pose information associated with the new aerial images. In some embodiments, the geographic area depicted in the first set of new aerial images is the same geographic area depicted in an aerial image processed between for-loop start block 408 and for-loop end block 418. In some embodiments, the geographic area depicted in the first set of new aerial images overlaps the geographic area depicted in an aerial image processed between for-loop start block 408 and for-loop end block 418, in which case further processing may be limited to the overlapping portion. In some embodiments, the new aerial images are of the same geographic area, but are taken from a different pose, at a different time of day, during a different season, during different weather conditions, or otherwise appear different from the previously processed aerial images of the geographic area.

FIG. 12 illustrates a non-limiting example embodiment of a set of aerial images of a single geographic area according to various aspects of the present disclosure. As shown, the set of aerial images includes a first aerial image 1202 and a second aerial image 1204. The first aerial image 1202 and second aerial image 1204 show the same street, the same set of houses, and the same structures to be annotated. However, the two aerial images are taken from a different pose, such that the second aerial image 1204 is rotated approximately 180 degrees from the first aerial image 1202, and the second aerial image 1204 is taken from a slightly different angle (see the top-down view of the car at the bottom right of first aerial image 1202, whereas the side window of the same car can be seen in the top left of second aerial image 1204). FIG. 12 shows annotations of the structures, and illustrates together how aerial images taken of the same geographic area from different poses can increase the size of a training data set since the structures will appear differently from each different pose (yet the geographical locations of the structures will remain the same).

Returning to FIG. 5, the method 400 proceeds to a for-loop defined between a for-loop start block 508 and a for-loop end block 516, wherein each new aerial image of the first set of new aerial images is processed to add model-generated annotations. From the for-loop start block 508, the method 400 proceeds to block 510, where the automatic annotation engine 314 generates model-generated annotations for the new aerial image using the bootstrap machine learning model. Typically, the new aerial image is provided to the bootstrap machine learning model as an input, and locations within the new aerial image for the model-generated annotations are provided by the bootstrap machine learning model as output.

At block 512, the geographic location determination engine 318 determines geographical locations of the structures in the new aerial image based on the model-generated annotations and the pose information. In some embodiments, the determination of the geographical locations is similar to the determination made in block 416.

At block 514, the automatic annotation engine 314 updates the probabilistic localizer model based on the geographical locations of the structures in the new aerial image. As discussed above with respect to block 416 and as illustrated in FIG. 9 and FIG. 10, any suitable technique may be used to update the probabilistic localizer model, including using Bayesian inferencing to update the existing probability value for the segment of the probabilistic localizer model associated with the geographical location of each structure in the new aerial image as determined based on the model-generated annotations. In some embodiments, the confidence scores generated by the bootstrap machine learning model for the model-generated annotations may be used to update the probabilities stored in the probabilistic localizer model.

The method 400 then proceeds to the for-loop end block 516. If further new aerial images remain to be processed, then the method 400 returns to for-loop start block 508. Otherwise, the method 400 proceeds to a continuation terminal ("terminal B").

From terminal B (FIG. 6), the method 400 proceeds to block 602, where the image collection engine 312 receives a second set of new aerial images of the geographic area and pose information associated with the new aerial images. The method 400 then proceeds to a for-loop defined between a for-loop start block 604 and a for-loop end block 612, wherein each aerial image of the second set of new aerial images is annotated using the probabilistic localizer model. By doing this, the learning provided by the model-generated annotations and the probabilistic localizer model can be geometrically transferred to the second set of new aerial images.

From the for-loop start block 604, the method 400 proceeds to block 606, where the geographic location determination engine 318 determines locations within the new aerial image associated with high-probability locations indicated by the probabilistic localizer model. For example, a probability threshold may be established that indicates when a probability stored in the probabilistic localizer model is high enough to indicate a likely presence of a structure. Referring for example to FIG. 10, a probability threshold of 70% would correctly cause the first grid square 904 and the second grid square 906 to be selected as highly-probable geographical locations.

At block 608, the automatic annotation engine 314 generates geography-based annotations for the determined locations within the new aerial image. In some embodiments, this process may be similar to that described above for determining the geographical location of an annotation, but in reverse. Returning to FIG. 11, the first voxel 1104 had been previously determined to be a highly probable voxel by the probabilistic localizer model 1100. The ray 810 is drawn to extend from the camera 102 of the autonomous vehicle 200, through the first voxel 1104. The image location 812 for the geography-based annotation can then be determined by determining a point where the ray 810 intersects the image 804. One will note that the accuracy and precision of the geography-based annotation may be affected by the granularity of the probabilistic localizer grid 1102, as well as the accuracy of the pose information, the length of the ray 810, and the distance between the terrain model 808 and the image surface 804.

Returning to FIG. 6, at block 610, the automatic annotation engine 314 adds the new aerial image and the geography-based annotations to an updated training data set in the model data store 320. The method 400 then proceeds to the for-loop end block 612. If further new aerial images remain to be processed in the second set of new aerial images, then the method 400 returns to the for-loop start block 604 to process the next new aerial image. Otherwise, the method 400 proceeds to block 614.

At block 614, the model training engine 316 re-trains the bootstrap machine learning model using the updated training data set to create a retrained machine learning model. Using the geography-based annotations as the basis for the updated training data set allows the knowledge that built the bootstrap machine learning model to be transferred to the retrained machine learning model via the geographical information, and this transfer allows the retrained machine learning model to have much higher precision and recall due to the ability to use a much larger training set.

At block 616, the model training engine 316 stores the retrained machine learning model in the model data store 320. At this point, the retrained machine learning model can be used for any suitable purpose. For example, at block 618, the image collection engine 312 receives an aerial image of a new geographic area. At block 620, the automatic annotation engine 314 generates model-generated annotations of structures within the new geographic area using the retrained machine learning model. The model-generated annotations generated by the retrained machine learning model have higher precision and recall than the bootstrap machine learning model, and so the results for the new geographic area will be of higher quality. At block 622, a route is planned for an unmanned vehicle to avoid geographical locations associated with the structures in the new geographic area. Since the model-generated annotations generated by the retrained machine learning model are of higher quality, they are reliable enough to use for navigation, even without having trained the retrained machine learning model on images of the new geographic area.

The method 400 then proceeds to an end block and terminates.

Figure 13:
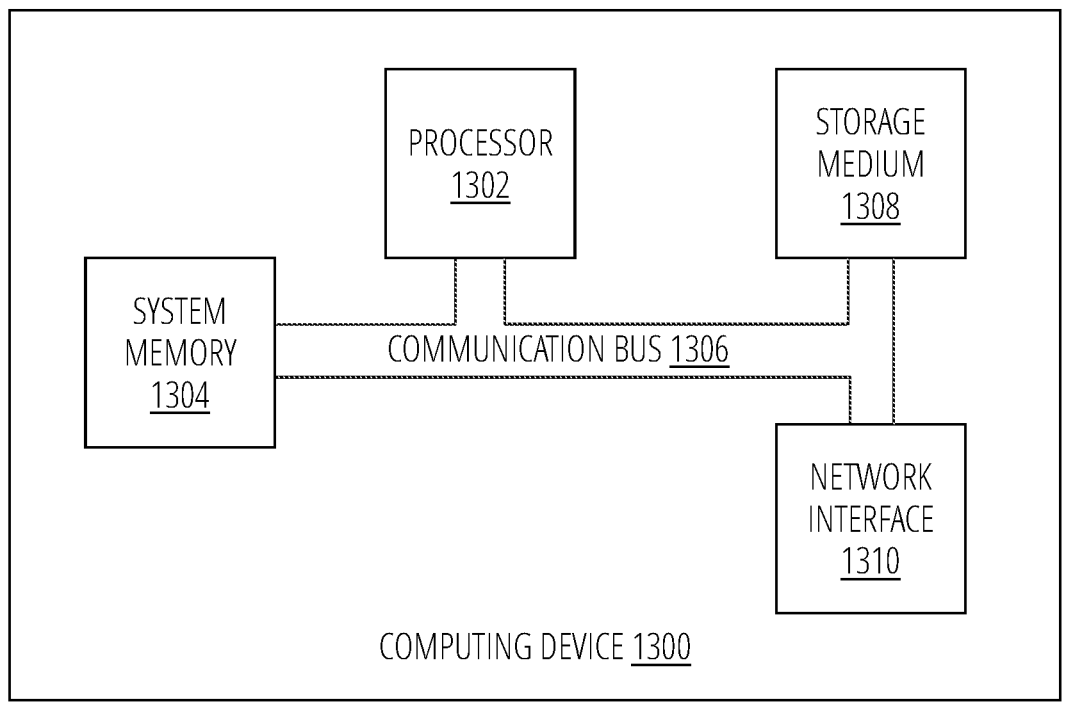
FIG. 13 is a block diagram that illustrates a non-limiting example embodiment of a computing device appropriate for use with embodiments of the present disclosure.

FIG. 13 is a block diagram that illustrates aspects of an exemplary computing device 1300 appropriate for use as a computing device of the present disclosure. While multiple different types of computing devices were discussed above, the exemplary computing device 1300 describes various elements that are common to many different types of computing devices. While FIG. 13 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 1300 may be any one of any number of currently available or yet to be developed devices.

In its most basic configuration, the computing device 1300 includes at least one processor 1302 and a system memory 1304 connected by a communication bus 1306. Depending on the exact configuration and type of device, the system memory 1304 may be volatile or nonvolatile memory, such as read only memory ("ROM"), random access memory ("RAM"), EEPROM, flash memory, or similar memory technology. Those of ordinary skill in the art and others will recognize that system memory 1304 typically stores data and/or program modules that are immediately accessible to and/or currently being operated on by the processor 1302. In this regard, the processor 1302 may serve as a computational center of the computing device 1300 by supporting the execution of instructions.

As further illustrated in FIG. 13, the computing device 1300 may include a network interface 1310 comprising one or more components for communicating with other devices over a network. Embodiments of the present disclosure may access basic services that utilize the network interface 1310 to perform communications using common network protocols. The network interface 1310 may also include a wireless network interface configured to communicate via one or more wireless communication protocols, such as Wi-Fi, 2G, 3G, LTE, WiMAX, Bluetooth, Bluetooth low energy, and/or the like. As will be appreciated by one of ordinary skill in the art, the network interface 1310 illustrated in FIG. 13 may represent one or more wireless interfaces or physical communication interfaces described and illustrated above with respect to particular components of the computing device 1300.

In the exemplary embodiment depicted in FIG. 13, the computing device 1300 also includes a storage medium 1308. However, services may be accessed using a computing device that does not include means for persisting data to a local storage medium. Therefore, the storage medium 1308 depicted in FIG. 13 is represented with a dashed line to indicate that the storage medium 1308 is optional. In any event, the storage medium 1308 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As discussed above, the term "computer-readable medium" includes volatile and non-volatile and removable and non-removable media implemented in any method or technology capable of storing information, such as computer readable instructions, data structures, program modules, or other data. In this regard, the system memory 1304 and storage medium 1308 depicted in FIG. 13 are merely examples of computer-readable media.

Suitable implementations of computing devices that include a processor 1302, system memory 1304, communication bus 1306, storage medium 1308, and network interface 1310 are known and commercially available. For ease of illustration and because it is not important for an understanding of the claimed subject matter, FIG. 13 does not show some of the typical components of many computing devices. In this regard, the computing device 1300 may include input devices, such as a keyboard, keypad, mouse, microphone, touch input device, touch screen, tablet, and/or the like. Such input devices may be coupled to the computing device 1300 by wired or wireless connections including RF, infrared, serial, parallel, Bluetooth, Bluetooth low energy, USB, or other suitable connections protocols using wireless or physical connections. Similarly, the computing device 1300 may also include output devices such as a display, speakers, printer, etc. Since these devices are well known in the art, they are not illustrated or described further herein.

While illustrative embodiments have been illustrated and described, it will be appreciated that various changes can be made therein without departing from the spirit and scope of the disclosure. For example, though the above discussion relates primarily to aerial images, in some embodiments, other types of images that are associated with pose information and locations for annotated objects may be used.

In the foregoing description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The order in which some or all of the process blocks appear in each process should not be deemed limiting. Rather, one of ordinary skill in the art having the benefit of the present disclosure will understand that some of the process blocks may be executed in a variety of orders not illustrated, or even in parallel.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-transitory computer-readable storage medium having instructions stored thereon that, in response to execution by one or more processors of a computing system, cause the computing system to perform actions comprising:
    determining geographical locations of one or more structures in a geographic area;
    obtaining an aerial image of the geographic area; and
    annotating the aerial image based at least on the determined geographical locations of the one or more structures in the geographic area;
    wherein determining the geographical locations of one or more structures in the geographic area includes determining annotations of the one or more structures within aerial images of a set of aerial images of the geographic area; and
    wherein determining annotations of the one or more structures within the aerial images of the set of aerial images of the geographic area includes:
        receiving a first set of aerial images of the geographic area;
        creating manual annotations of one or more structures within the first set of aerial images;
        training a bootstrap machine learning model based on the first set of aerial images and the manual annotations;
        receiving a second set of aerial images of the geographic area; and
        creating model-generated annotations of the one or more structures within the second set of aerial images using the bootstrap machine learning model.

2. The computer-readable storage medium of claim 1, wherein annotating the aerial image based at least on the determined geographical locations of the one or more structures in the geographic area includes, for each structure of the one or more structures:
    determining, using a probabilistic localizer model, a most likely geographical location for the structure;
    determining a pose of a camera that captured the aerial image; and
    determining an image location for an annotation by determining an intersection between an image plane of the aerial image and a ray extending from the pose of the camera through a terrain model at the most likely geographical location.

3. The computer-readable storage medium of claim 1, wherein the actions further comprise:
    adding the annotated aerial image to a training data set; and
    training a machine learning model using the training data set.

4. The computer-readable storage medium of claim 1, wherein determining the geographical locations of the one or more structures in the geographic area includes:
    determining geographical locations associated with the annotations; and
    updating a probabilistic localizer model based on the determined geographical locations.

5. The computer-readable storage medium of claim 4, wherein updating the probabilistic localizer model based on the determined geographical locations includes updating one or more segments of the probabilistic localizer model based on the determined geographical locations using Bayesian inferencing.

6. The computer-readable storage medium of claim 4, wherein determining the geographical locations associated with the annotations includes, for each annotation and the associated aerial image:
    determining a pose of a camera that captured the aerial image; and
    determining the geographical location based on an image location of the annotation and the pose of the camera.

7. The computer-readable storage medium of claim 6, wherein determining the geographical location based on the annotation and the pose of the camera includes:
    determining a terrain model of the geographic area; and
    determining an intersection between the terrain model and a ray extending from the camera to the annotation.

8. The computer-readable storage medium of claim 1, wherein the actions further comprise planning a route for an unmanned vehicle to avoid the determined geographical locations of the one or more structures.

9. A computer-implemented method for annotating aerial images, the method comprising:
    determining annotations of one or more structures within aerial images of a set of aerial images of a geographic area;
    determining geographical locations associated with the annotations;
    updating a probabilistic localizer model based on the determined geographical locations; and
    using the probabilistic localizer model to determine annotations for new aerial images of the geographic area;

wherein determining the geographical locations associated with the annotations includes, for each annotation and the associated aerial image:
  determining a pose of a camera that captured the associated aerial image; and
  determining the geographical location based on an image location of the annotation and the pose of the camera; and
wherein determining the geographical location based on the annotation and the pose of the camera includes:
  determining a terrain model of the geographic area; and
  determining an intersection between the terrain model and a ray extending from the camera to the annotation.

10. The computer-implemented method of claim 9, wherein updating the probabilistic localizer model based on the determined geographical locations includes updating one or more segments of the probabilistic localizer model based on the determined geographical locations using Bayesian inferencing.

11. The computer-implemented method of claim 9, wherein determining annotations of the one or more structures within the aerial images of the set of aerial images of the geographic area includes:
  receiving a first set of aerial images of the geographic area;
  creating manual annotations of one or more structures within the first set of aerial images;
  training a bootstrap machine learning model based on the first set of aerial images and the manual annotations;
  receiving a second set of aerial images of the geographic area; and
  creating model-generated annotations of the one or more structures within the second set of aerial images using the bootstrap machine learning model.

12. The computer-implemented method of claim 11, wherein creating model-generated annotations of the one or more structures within the second set of aerial images includes using the probabilistic localizer model to determine confidence scores for the annotations.

13. The computer-implemented method of claim 9, wherein determining the terrain model of the geographic area includes using a visual structure from motion (SFM) technique to determine the terrain model based on a plurality of aerial images of the geographic area.

14. The computer-implemented method of claim 9, wherein using the probabilistic localizer model to determine annotations for the new aerial images of the geographic area includes, for each new aerial image and for each structure of the one or more structures:
  determining, using the probabilistic localizer model, a most likely geographical location for the structure;
  determining a pose of a camera that captured the new aerial image; and
  determining an image location for an annotation by determining an intersection between an image plane of the new aerial image and a ray extending from the pose of the camera through a terrain model at the most likely geographical location.

15. The computer-implemented method of claim 14, further comprising:
  adding the new aerial image to an updated training data set; and
  re-training a machine learning model using the updated training data set.

16. The computer-implemented method of claim 15, further comprising:
  obtaining an aerial image of a new geographic area; and
  annotating the aerial image of the new geographic area using the retrained machine learning model.

17. The computer-implemented method of claim 9, further comprising planning a route for an unmanned vehicle to avoid the determined geographical locations associated with the annotations.

18. A non-transitory computer-readable storage medium having instructions stored thereon that, in response to execution by one or more processors of a computing system, cause the computing system to perform actions comprising:
  determining geographical locations of one or more structures in a geographic area;
  obtaining an aerial image of the geographic area; and
  annotating the aerial image based at least on the determined geographical locations of the one or more structures in the geographic area;
  wherein determining the geographical locations of one or more structures in the geographic area includes determining annotations of the one or more structures within aerial images of a set of aerial images of the geographic area, and determining geographical locations associated with the annotations;
  wherein determining the geographical locations associated with the annotations includes, for each annotation and the associated aerial image:
    determining a pose of a camera that captured the aerial image; and
    determining the geographical location based on an image location of the annotation and the pose of the camera; and
  wherein determining the geographical location based on the annotation and the pose of the camera includes:
    determining a terrain model of the geographic area; and
    determining an intersection between the terrain model and a ray extending from the camera to the annotation.

19. The computer-implemented method of claim 18, wherein determining the geographical locations of the one or more structures in the geographic area further includes updating a probabilistic localizer model based on the determined geographical locations associated with the annotations.

20. The computer-implemented method of claim 18, wherein determining annotations of the one or more structures within the aerial images of the set of aerial images of the geographic area includes:
  receiving a first set of aerial images of the geographic area;
  creating manual annotations of one or more structures within the first set of aerial images;
  training a bootstrap machine learning model based on the first set of aerial images and the manual annotations;
  receiving a second set of aerial images of the geographic area; and
  creating model-generated annotations of the one or more structures within the second set of aerial images using the bootstrap machine learning model.

21. A non-transitory computer-readable medium having logic stored thereon that, in response to execution by one or more processors of a computing system, cause the computing system to perform actions comprising:
  determining annotations of one or more structures within aerial images of a set of aerial images of a geographic area;
  determining geographical locations associated with the annotations;

updating a probabilistic localizer model based on the determined geographical locations; and using the probabilistic localizer model to determine annotations for new aerial images of the geographic area;

wherein determining the geographical locations associated with the annotations includes, for each annotation and the associated aerial image:
  determining a pose of a camera that captured the associated aerial image; and
  determining the geographical location based on an image location of the annotation and the pose of the camera; and wherein determining the geographical location based on the annotation and the pose of the camera includes:
  determining a terrain model of the geographic area; and
  determining an intersection between the terrain model and a ray extending from the camera to the annotation.

* * * * *